United States Patent
Yi et al.

(10) Patent No.: US 10,278,161 B2
(45) Date of Patent: Apr. 30, 2019

(54) METHOD FOR GENERATING A MAC CONTROL ELEMENT IN A CARRIER AGGREGATION SYSTEM AND A DEVICE THEREFOR

(71) Applicant: LG ELECTRONICS INC., Seoul (KR)

(72) Inventors: Seungjune Yi, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/559,505

(22) PCT Filed: Apr. 5, 2016

(86) PCT No.: PCT/KR2016/003514
§ 371 (c)(1),
(2) Date: Sep. 19, 2017

(87) PCT Pub. No.: WO2016/167506
PCT Pub. Date: Oct. 20, 2016

(65) Prior Publication Data
US 2018/0124763 A1 May 3, 2018

Related U.S. Application Data

(60) Provisional application No. 62/147,599, filed on Apr. 15, 2015.

(51) Int. Cl.
*H04W 72/04* (2009.01)
*H04L 12/24* (2006.01)
(Continued)

(52) U.S. Cl.
CPC ..... *H04W 72/0406* (2013.01); *H04L 41/0803* (2013.01); *H04L 61/6022* (2013.01);
(Continued)

(58) Field of Classification Search
CPC ............ H04W 72/0406; H04W 24/02; H04W 52/365; H04W 88/02; H04W 88/08; H04L 41/0803; H04L 61/6022
See application file for complete search history.

(56) References Cited

U.S. PATENT DOCUMENTS

| 2009/0219951 A1* | 9/2009 | Chun | ...................... H04W 8/26 370/474 |
| 2010/0118889 A1* | 5/2010 | Chun | ................... H04L 12/1886 370/469 |

(Continued)

FOREIGN PATENT DOCUMENTS

| KR | 10-2013-0001096 A | 3/2013 |
| WO | 2013119157 A1 | 8/2013 |
| WO | 2013151348 A1 | 10/2013 |

OTHER PUBLICATIONS

R2-144171: 3GPP TSG RAN WG2, "Discussion on New LCID for DC PHR MAC CE," Meeting #87 bis, Shanghai, China, Oct. 6-10, 2014.

*Primary Examiner* — Ajay Cattungal
(74) *Attorney, Agent, or Firm* — Dentons US LLP

(57) ABSTRACT

The present invention relates to a wireless communication system. More specifically, the present invention relates to a method and a device for generating a MAC CE in a carrier aggregation system, the method comprising: configuring a plurality of Timing Advance Groups (TAGs), wherein each of the plurality of TAGs corresponds to a respective TAG index; determining a size of a TAG index field in a MAC CE depending on a highest TAG index among the indices of the plurality of TAGs; and generating the Medium Access Control (MAC) Control Element (CE) according to the size of the TAG index field.

6 Claims, 9 Drawing Sheets

(51) Int. Cl.
  H04L 29/12  (2006.01)
  H04W 24/02 (2009.01)
  H04W 52/36  (2009.01)
  H04W 88/02  (2009.01)
  H04W 88/08  (2009.01)
(52) U.S. Cl.
  CPC ....... H04W 24/02 (2013.01); H04W 72/0413 (2013.01); *H04W 52/365* (2013.01); *H04W 88/02* (2013.01); *H04W 88/08* (2013.01)

(56) References Cited

U.S. PATENT DOCUMENTS

| | | | |
|---|---|---|---|
| 2010/0226325 A1* | 9/2010 | Chun | H04W 28/065 370/329 |
| 2010/0278111 A1* | 11/2010 | Kashima | H04W 28/065 370/328 |
| 2012/0099452 A1* | 4/2012 | Dai | H04W 72/1284 370/252 |
| 2012/0257601 A1* | 10/2012 | Kim | H04W 76/19 370/336 |
| 2012/0300752 A1* | 11/2012 | Kwon | H04W 56/0005 370/336 |
| 2013/0114576 A1* | 5/2013 | Kwon | H04W 56/0045 370/336 |
| 2013/0215866 A1* | 8/2013 | Ahn | H04W 52/04 370/329 |
| 2013/0301568 A1 | 11/2013 | Park et al. | |
| 2013/0301582 A1* | 11/2013 | Jiang | H04W 72/042 370/329 |
| 2014/0219115 A1 | 8/2014 | Etemad et al. | |
| 2015/0009985 A1 | 1/2015 | Kwon et al. | |
| 2016/0192388 A1 | 6/2016 | Ekpenyong et al. | |
| 2016/0301513 A1 | 10/2016 | He et al. | |
| 2016/0352493 A1 | 12/2016 | Tan et al. | |

* cited by examiner

[Fig. 1]
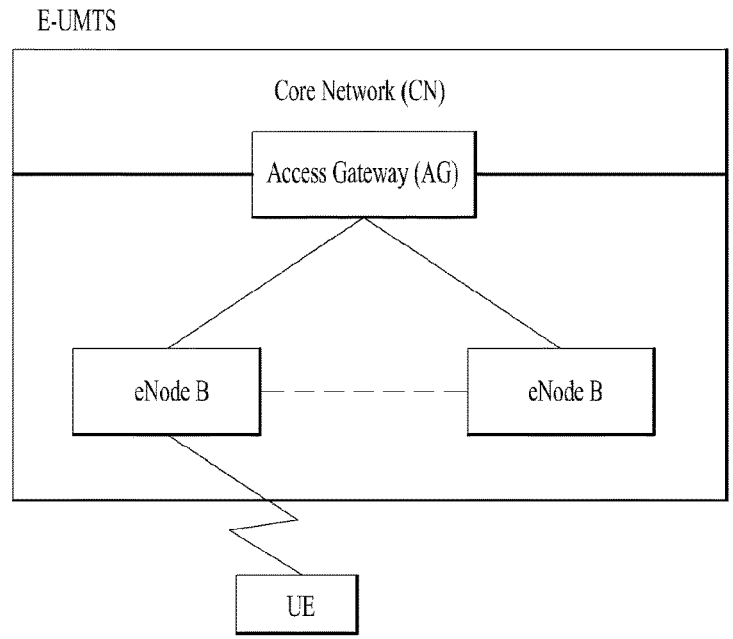
[Fig. 2A]
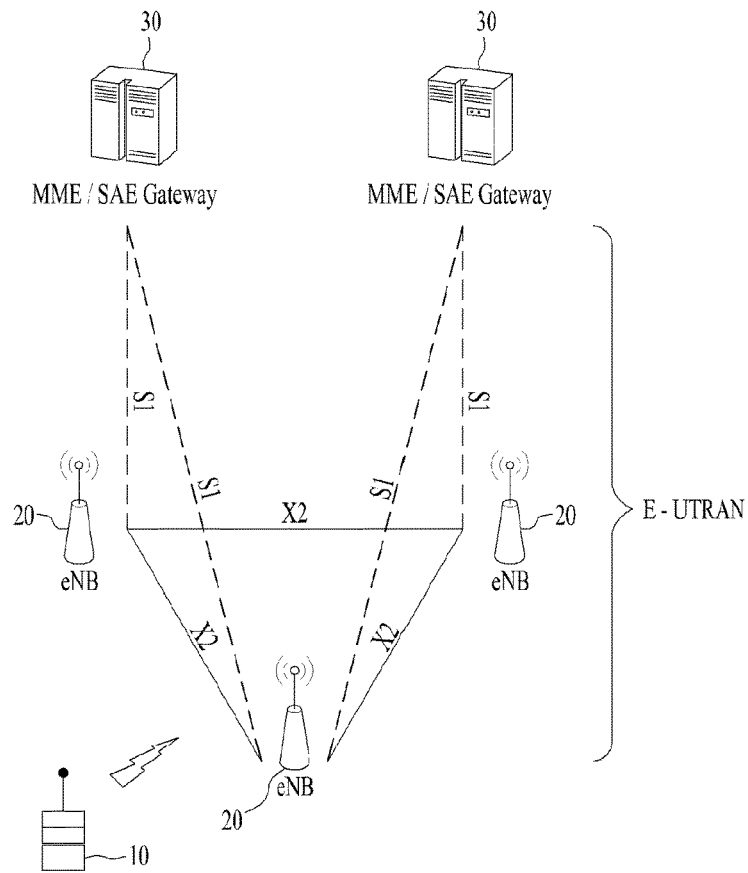

[Fig. 2B]
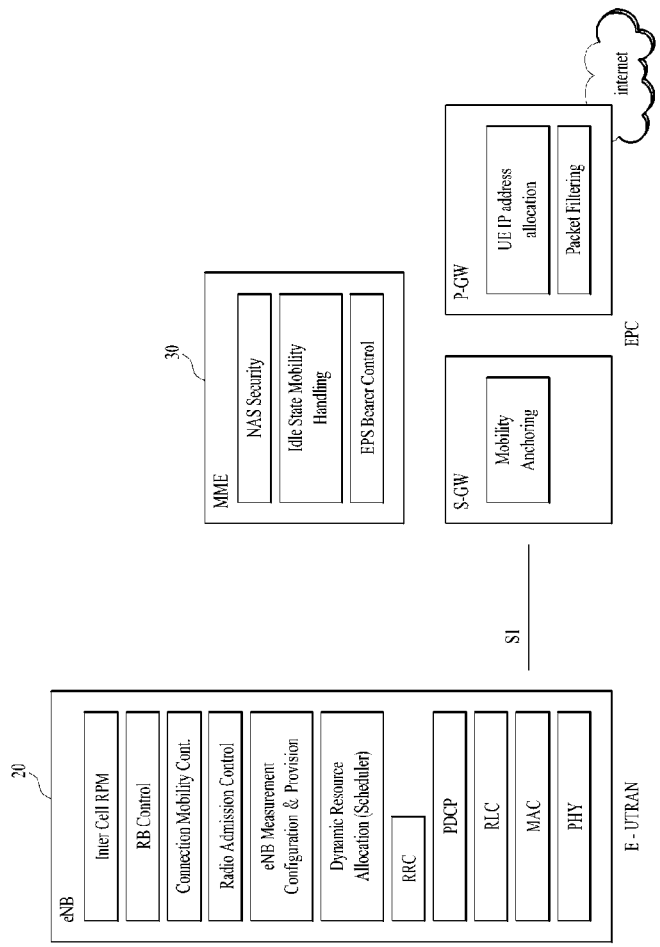

[Fig. 3]
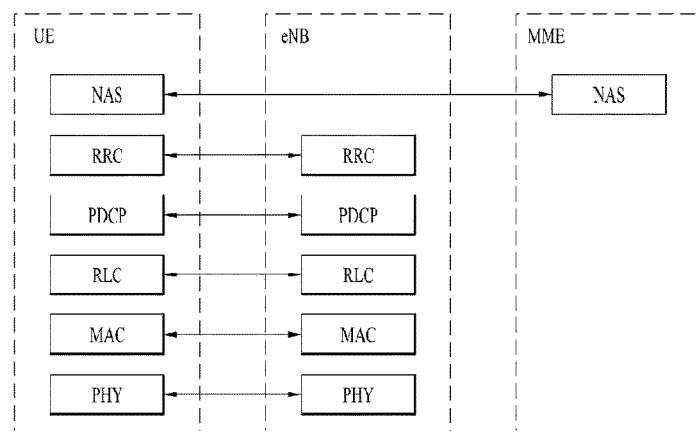
(a) Control-Plane Protocol Stack
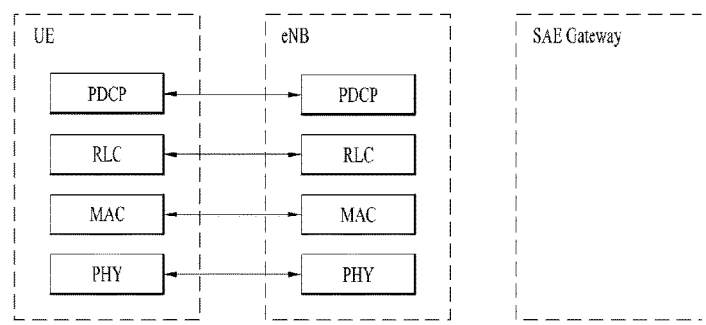
(b) User-Plane Protocol Stack
[Fig. 4]
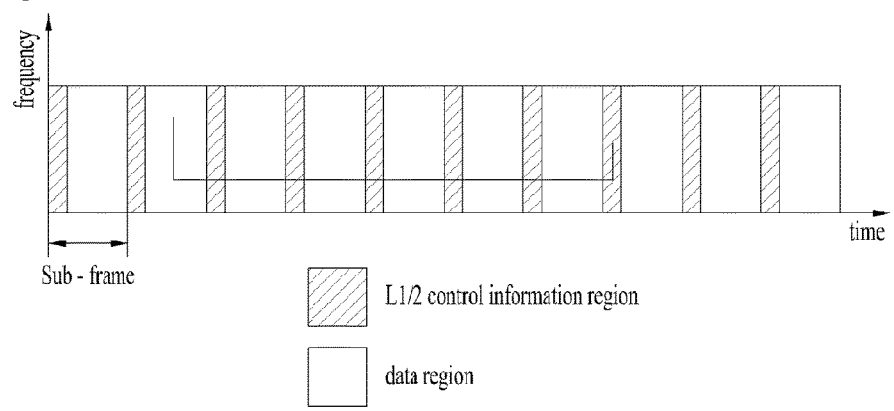

[Fig. 5]
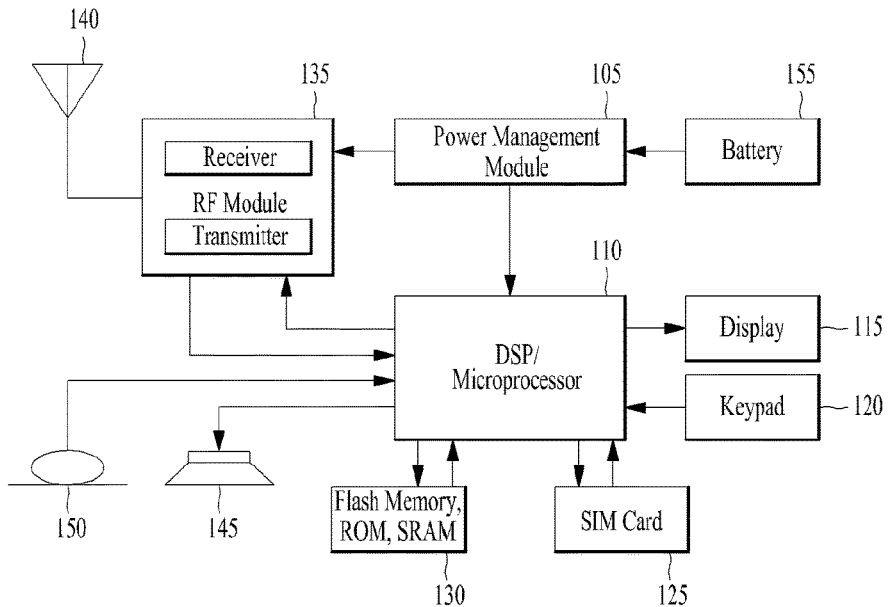
[Fig. 6]
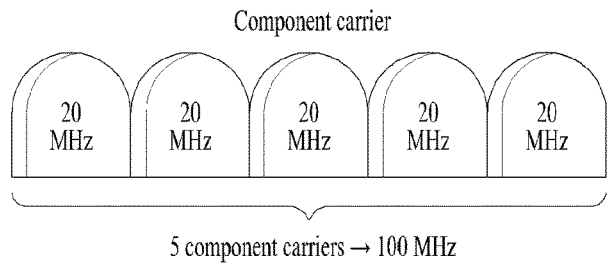
[Fig. 7]
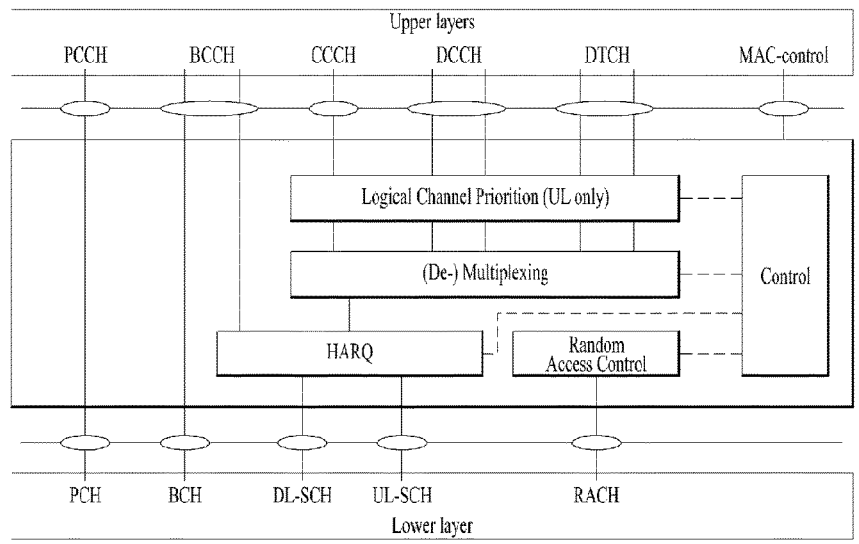

[Fig. 8A]
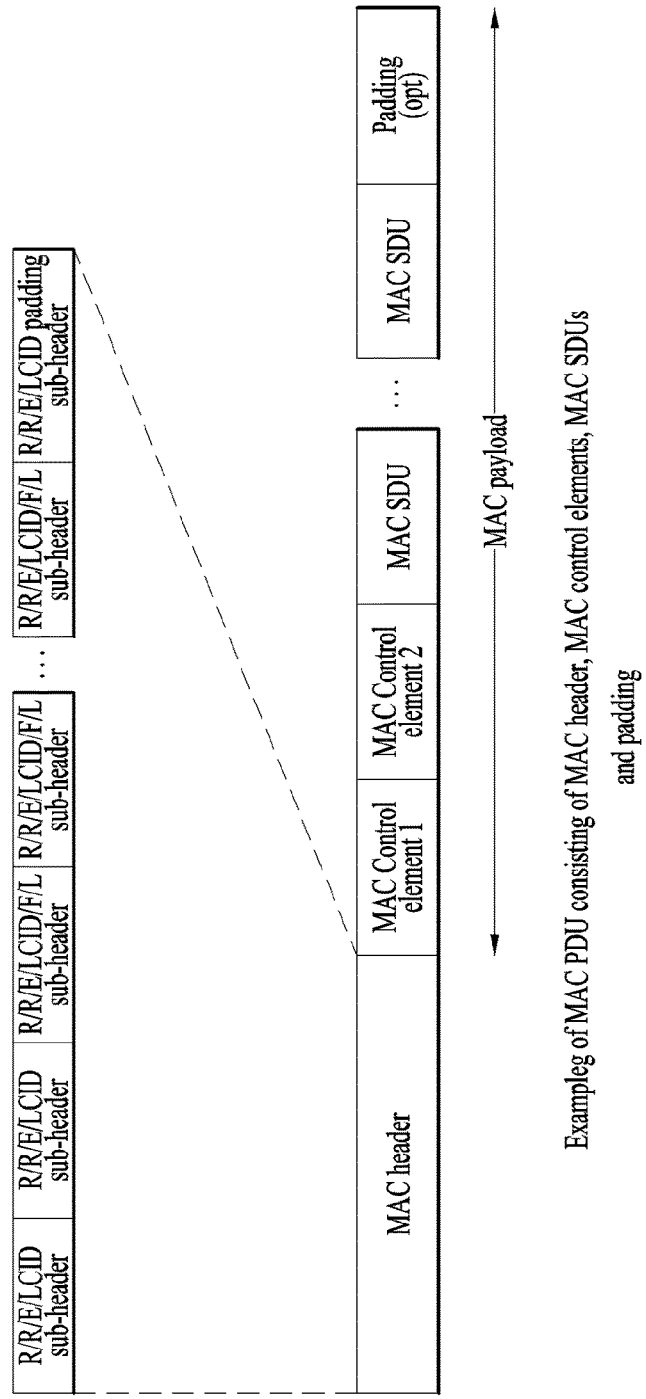
Exampleg of MAC PDU consisting of MAC header, MAC control elements, MAC SDUs and padding

[Fig. 8B]
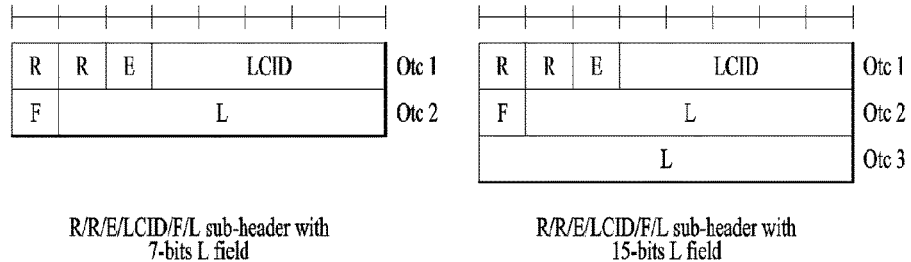
R/R/E/LCID/F/L sub-header with
7-bits L field
R/R/E/LCID/F/L sub-header with
15-bits L field
[Fig. 8C]
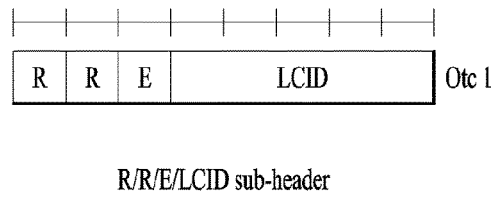
R/R/E/LCID sub-header
[Fig. 9A]
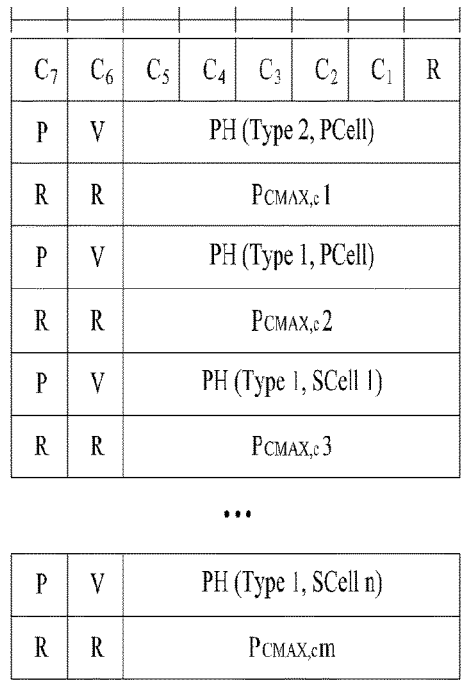

[Fig. 9B]
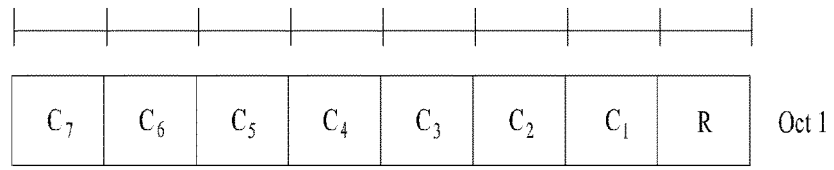
[Fig. 10]
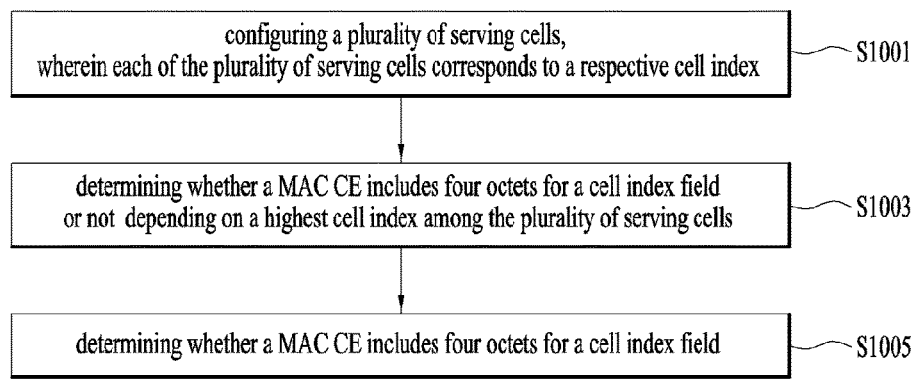

[Fig. 11A]

| $C_7$ | $C_6$ | $C_5$ | $C_4$ | $C_3$ | $C_2$ | $C_1$ | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH ( Type 2, PCell ) ||||||
| R | R | $P_{CMAX,C}$ 1 ||||||
| P | V | PH ( Type 1, PCell ) ||||||
| R | R | $P_{CMAX,C}$ 3 ||||||
| P | V | PH ( Type 1, SCell 1 ) ||||||
| R | R | $P_{CMAX,C}$ 4 ||||||

. . .

| P | V | PH ( Type 1, SCell m ) ||||||
| R | R | $P_{CMAX,C}$ m ||||||

[Fig. 11B]

| $C_7$ | $C_6$ | $C_5$ | $C_4$ | $C_3$ | $C_2$ | $C_1$ | R | |
|---|---|---|---|---|---|---|---|---|
| $C_7$ | $C_6$ | $C_5$ | $C_4$ | $C_3$ | $C_2$ | $C_1$ | R | Oct 1 |
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | Oct 4 |

[Fig. 12]
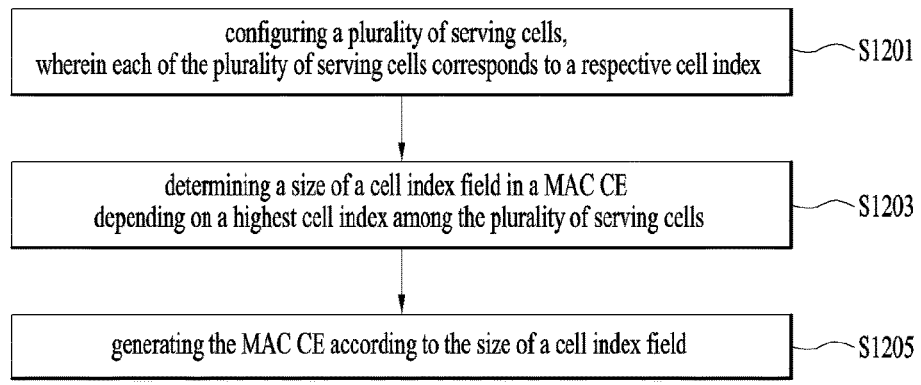
[Fig. 13]
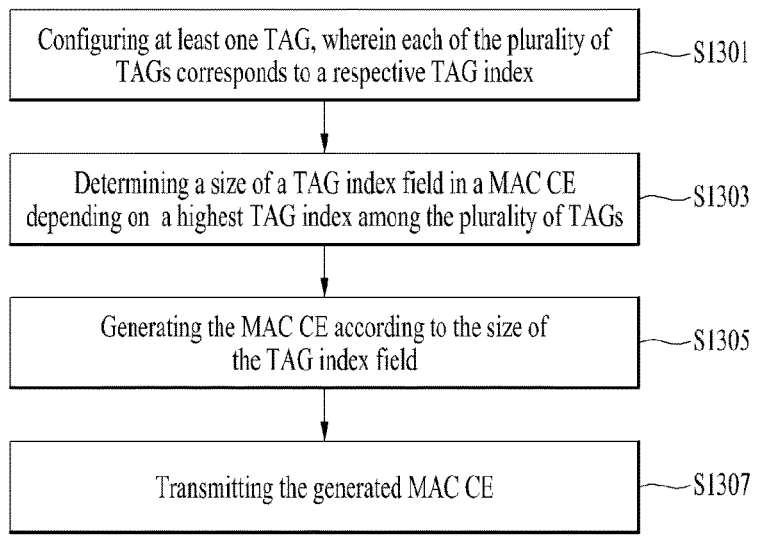

METHOD FOR GENERATING A MAC CONTROL ELEMENT IN A CARRIER AGGREGATION SYSTEM AND A DEVICE THEREFOR

This application is a 35 USC § 371 National Stage entry of International Application No. PCT/KR2016/003514 filed on Apr. 5, 2016, and claims priority to U.S. Provisional Application No. 62/147,599 filed on Apr. 15, 2015, all of which are hereby incorporated by reference in their entireties as if fully set forth herein.

TECHNICAL FIELD

The present invention relates to a wireless communication system and, more particularly, to a method for generating a MAC control element in a carrier aggregation system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for generating a MAC control element in a carrier aggregation system. The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

According to the present invention, a Timing Advance Control (TAC) MAC CE format is determined based on the highest TAG index among the indices of the plurality of TAGs, wherein each of the plurality of TAGs corresponds to a respective TAG index.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a view showing an example of a physical channel structure used in an E-UMTS system;

FIG. 5 is a block diagram of a communication apparatus according to an embodiment of the present invention;

FIG. 6 is a diagram for carrier aggregation;

FIG. 7 is a diagram for MAC structure overview in a UE side;

FIGS. 8A to 8C are conceptual diagrams illustrating for a MAC PDU structure;

FIG. 9A is an example for Extended PHR MAC Control Element in a conventional carrier aggreagtion system, and FIG. 9B is example for Activation/Deactivation MAC control element in a conventional carrier aggreagtion system;

FIG. 10 is a conceptual diagram for generating a MAC control element in a carrier aggregation system according to embodiments of the present invention;

FIG. 11A is an example for a PHR MAC CE with four octets in a carrier aggregation system according to embodiments of the present invention, and FIG. 11B is an example for a Activation/Deactivation MAC CE with for octets in a carrier aggregation system according to embodiments of the present invention;

FIG. 12 is a conceptual diagram for generating a MAC control element in a carrier aggregation system according to embodiments of the present invention; and FIG. 13 is a conceptual diagram for generating a MAC control element in a carrier aggregation system according to embodiments of the present invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver;

135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 6 is a diagram for carrier aggregation.

Carrier Aggregation (CA) technology for supporting multiple carriers is described with reference to FIG. 6 as follows. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

When CA is configured, the UE only has one RRC connection with the network. At RRC connection establishment/re-establishment/handover, one serving cell provides the NAS mobility information (e.g. TAI), and at RRC connection re-establishment/handover, one serving cell provides the security input. This cell is referred to as the Primary Cell (PCell). In the downlink, the carrier corresponding to the PCell is the Downlink Primary Component Carrier (DL PCC) while in the uplink it is the Uplink Primary Component Carrier (UL PCC).

Depending on UE capabilities, Secondary Cells (SCells) can be configured to form together with the PCell a set of serving cells. In the downlink, the carrier corresponding to an SCell is a Downlink Secondary Component Carrier (DL SCC) while in the uplink it is an Uplink Secondary Component Carrier (UL SCC).

The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

FIG. 7 is a diagram for MAC structure overview in a UE side.

The MAC layer handles logical-channel multiplexing, hybrid-ARQ retransmissions, and uplink and downlink scheduling. It is also responsible for multiplexing/demultiplexing data across multiple component carriers when carrier aggregation is used.

The MAC provides services to the RLC in the form of logical channels. A logical channel is defined by the type of information it carries and is generally classified as a control channel, used for transmission of control and configuration information necessary for operating an LTE system, or as a traffic channel, used for the user data. The set of logical channel types specified for LTE includes Broadcast Control Channel (BCCH), Paging Control Channel (PCCH), Common Control Channel (CCCH), Dedicated Control Channel (DCCH), Multicast Control Channel (MCCH), Dedicated Traffic Channel (DTCH), Multicast Traffic Channel (MTCH).

From the physical layer, the MAC layer uses services in the form of transport channels. A transport channel is defined by how and with what characteristics the information is transmitted over the radio interface. Data on a transport channel is organized into transport blocks. In each Transmission Time Interval (TTI), at most one transport block of dynamic size is transmitted over the radio interface to/from a terminal in the absence of spatial multiplexing. In the case of spatial multiplexing (MIMO), there can be up to two transport blocks per TTI.

Associated with each transport block is a Transport Format (TF), specifying how the transport block is to be transmitted over the radio interface. The transport format includes information about the transport-block size, the modulation-and-coding scheme, and the antenna mapping. By varying the transport format, the MAC layer can thus realize different data rates. Rate control is therefore also known as transport-format selection.

To support priority handling, multiple logical channels, where each logical channel has its own RLC entity, can be multiplexed into one transport channel by the MAC layer. At the receiver, the MAC layer handles the corresponding demultiplexing and forwards the RLC PDUs to their respective RLC entity for in-sequence delivery and the other functions handled by the RLC. To support the demultiplexing at the receiver, a MAC is used. To each RLC PDU, there is an associated sub-header in the MAC header. The sub-header contains the identity of the logical channel (LCID) from which the RLC PDU originated and the length of the PDU in bytes. There is also a flag indicating whether this is the last sub-header or not. One or several RLC PDUs, together with the MAC header and, if necessary, padding to meet the scheduled transport-block size, form one transport block which is forwarded to the physical layer.

In addition to multiplexing of different logical channels, the MAC layer can also insert the so-called MAC control elements into the transport blocks to be transmitted over the transport channels. A MAC control element is used for inband control signaling—for example, timing-advance commands and random-access response. Control elements are identified with reserved values in the LCID field, where the LCID value indicates the type of control information.

Furthermore, the length field in the sub-header is removed for control elements with a fixed length.

The MAC multiplexing functionality is also responsible for handling of multiple component carriers in the case of carrier aggregation. The basic principle for carrier aggregation is independent processing of the component carriers in the physical layer, including control signaling, scheduling and hybrid-ARQ retransmissions, while carrier aggregation is invisible to RLC and PDCP. Carrier aggregation is therefore mainly seen in the MAC layer, where logical channels, including any MAC control elements, are multiplexed to form one (two in the case of spatial multiplexing) transport block(s) per component carrier with each component carrier having its own hybrid-ARQ entity.

FIGS. 8A to 8B are conceptual diagrams illustrating for a MAC PDU structure.

FIG. 8A is a diagram for MAC PDU consisting of MAC header, MAC control elements, MAC SDUs and padding. A MAC PDU header consists of one or more MAC PDU subheaders, each subheader corresponds to either a MAC SDU, a MAC control element or padding.

A MAC PDU subheader consists of the six header fields R/R/E/LCID/F/L but for the last subheader in the MAC PDU and for fixed sized MAC control elements. The last sub-header in the MAC PDU and subheaders for fixed sized MAC control elements consist solely of the four header fields R/R/E/LCID. A MAC PDU subheader corresponding to padding consists of the four header fields R/R/E/LCID.

MAC PDU subheaders have the same order as the corresponding MAC SDUs, MAC control elements and padding. MAC control elements are always placed before any MAC SDU.

Padding occurs at the end of the MAC PDU, except when single-byte or two-byte padding is required. Padding may have any value and the UE shall ignore it. When padding is performed at the end of the MAC PDU, zero or more padding bytes are allowed.

When single-byte or two-byte padding is required, one or two MAC PDU subheaders corresponding to padding are placed at the beginning of the MAC PDU before any other MAC PDU subheader. A maximum of one MAC PDU can be transmitted per TB per UE. A maximum of one MCH MAC PDU can be transmitted per TTI.

The MAC header is of variable size and consists of the following fields:

1) LCID: The Logical Channel ID field identifies the logical channel instance of the corresponding MAC SDU or the type of the corresponding MAC control element or padding as described in Tables 1, 2 and 3 for the DL-SCH, UL-SCH and MCH respectively. There is one LCID field for each MAC SDU, MAC control element or padding included in the MAC PDU. In addition to that, one or two additional LCID fields are included in the MAC PDU, when single-byte or two-byte padding is required but cannot be achieved by padding at the end of the MAC PDU. A UE of Category 0 shall indicate CCCH using LCID "01011", otherwise the UE shall indicate CCCH using LCID "00000". The LCID field size is 5 bits.

TABLE 1

Values of LCID for DL-SCH

| Index | LCID values |
|---|---|
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

TABLE 2

Values of LCID for UL-SCH

| Index | LCID values |
|---|---|
| 00000 | CCCH |
| 00001-01010 | Identity of the logical channel |
| 01011 | CCCH |
| 01100-10101 | Reserved |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

TABLE 3

Values of LCID for MCH

| Index | LCID values |
|---|---|
| 00000 | MCCH (see note) |
| 00001-11100 | MTCH |
| 11101 | Reserved |
| 11110 | MCH Scheduling Information or Extended MCH Scheduling Information |
| 11111 | Padding |

NOTE:
If there is no MCCH on MCH, an MTCH could use this value.

2) L: The Length field indicates the length of the corresponding MAC SDU or variable-sized MAC control element in bytes. There is one L field per MAC PDU subheader except for the last subheader and subheaders corresponding to fixed-sized MAC control elements. The size of the L field is indicated by the F field.

3) F: The Format field indicates the size of the Length field as indicated in Table 4. There is one F field per MAC PDU subheader except for the last subheader and subheaders corresponding to fixed-sized MAC control elements. The size of the F field is 1 bit. If the size of the MAC SDU or variable-sized MAC control element is less than 128 bytes, the value of the F field is set to 0, otherwise it is set to 1.

TABLE 4

| Values of F field | |
|---|---|
| Index | Size of Length field (in bits) |
| 0 | 7 |
| 1 | 15 |

4) E: The Extension field is a flag indicating if more fields are present in the MAC header or not. The E field is set to "1" to indicate another set of at least R/R/E/LCID fields. The E field is set to "0" to indicate that either a MAC SDU, a MAC control element or padding starts at the next byte.

5) R: Reserved bit, set to "0".

FIG. 9A is an example for Extended PHR MAC Control Element in a conventional carrier aggreagtion system, and FIG. 9B is example for Activation/Deactivation MAC control element in a conventional carrier aggreagtion system.

The MAC control Element includes control information for a MAC behavior. There are Buffer Status Report MAC Control Element, C-RNTI MAC Control Element, DRX Command MAC Control Element, UE Contention Resolution Identity MAC Control Element, Timing Advance Command MAC Control Element, Power Headroom Report MAC Control Element, MCH Scheduling Information MAC Control Element, and Activation/Deactivation MAC Control Elements.

For extendedPH, the Extended Power Headroom Report (PHR) MAC control element is identified by a MAC PDU subheader with LCID as specified in Table 2. It has a variable size and is defined in FIG. 9A. When Type 2 PH is reported, the octet containing the Type 2 PH field is included first after the octet indicating the presence of PH per SCell and followed by an octet containing the associated $P_{CMAX,c}$ field (if reported). Then follows in ascending order based on the ServCellIndex an octet with the Type 1 PH field and an octet with the associated $P_{CMAX,c}$ field (if reported), for the PCell and for each SCell indicated in the bitmap.

A "$C_i$ field" indicates the presence of a PH field for the SCell with SCellIndex i. The $C_i$ field set to "1" indicates that a PH field for the SCell with SCellIndex i is reported. The $C_i$ field set to "0" indicates that a PH field for the SCell with SCellIndex i is not reported.

A "R field" is a reserved bit, set to "0".

A "V field" indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. Furthermore, for both Type 1 and Type 2 PH, V=0 indicates the presence of the octet containing the associated $P_{CMAX,c}$ field, and V=1 indicates that the octet containing the associated $P_{CMAX,c}$ field is omitted.

A "Power Headroom (PH) field" indicates the power headroom level. The length of the field is 6 bits. The reported PH and the corresponding power headroom levels are shown in Table 5.

TABLE 5

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

A "P field" indicates whether the MAC entity applies power backoff due to power management (as allowed by P-MPR$_c$). The MAC entity shall set P=1 if the corresponding $P_{CMAX,c}$ field would have had a different value if no power backoff due to power management had been applied.

A $P_{CMAX,c}$ field indicates the $P_{CMAX,c}$ or $\tilde{P}_{CMAX,c}$ used for calculation of the preceding PH field, if present. The reported $P_{CMAX,c}$ and the corresponding nominal UE transmit power levels.

The Activation/Deactivation MAC control element of one octet is identified by a MAC PDU subheader with LCID as specified in Table 1. It has a fixed size and consists of a single octet containing seven C-fields and one R-field. The Activation/Deactivation MAC control element with one octet is defined as FIG. 9B.

A "$C_i$ field" indicates the activation/deactivation status of the SCell with SCellIndex if there is an SCell configured with SCellIndex i. Else the MAC entity shall ignore the $C_i$ field. The $C_i$ field is set to "1" to indicate that the SCell with SCellIndex i shall be activated. The $C_i$ field is set to "0" to indicate that the SCell with SCellIndex i shall be deactivated.

Up to Rel-12, up to 5 cells can be configured to the UE. In Rel-13, in the scope of CA enhancement, configuring up to 32 carriers is possible. Currently, the IE SCellIndex and ServCellIndex is used to identify a SCell and a serving cell (i.e. the PCell or a SCell) for the procedure of addition/modification/release and activation/deactivation of SCell(s). In addition, ServCellIndex is used as 3-bit carrier indicator field (CIF) in DCI formats if the UE is configured with cross-carrier scheduling. These IEs can indicate up to 7 SCells and up to 8 serving cells in the current specification.

For CA up to 32 CCs, the serving cell indexing value become insufficient. A most straightforward option to address this issue is to extend the range of SCellIndex and ServCellIndex values in accordance with the increased CC numbers (i.e. 32). Additionally, modification on the related MAC CEs, including Activation/Deactivation and extended PHR MAC CE, is likely needed. It is simple approach but adding more bits in MAC CEs to extend cell index should increase signaling overhead. Furthermore, extending the range of SerCellIndex may result in increasing the number of carrier indicator field (CIF) bits to 5 bits in DCI format in case of cross-carrier scheduling. Therefore, an optimization is needed to reduce the size the MAC CE in this case.

FIG. 10 is a conceptual diagram for generating a MAC control element in a carrier aggregation system according to embodiments of the present invention.

In this invention, the MAC CE format is determined based on the highest cell index (i.e, SCellIndex or ServCellIndex) among the cell index of the cells. In detail, the eNB and the UE determine the length of the Ci field of the MAC CE according to the highest cell index among the cell index of the cells.

The communication apparatus (i.e, a user equipment (UE), or a base station (BS)) is configured with at least two cells by the eNB, wherein each cell is identified by its own cell index (S1001).

And the communication apparatus determines whether a MAC CE includes four octets for a cell index field or not depending on a highest cell index among the plurality of serving cells (S1003), and the communication apparatus generates and transmits the MAC CE according to the determining (S1005).

The UE or the eNB can transmit a MAC control element to the eNB or the UE, respectively. For example, the eNB can transmit Activation/Deactivation MAC control element to the UE, and the UE can transmit Extended PHR MAC CE, Dual Connectivity Power Headroom Report MAC Control Element to the eNB.

If the highest cell index is less than 8, the MAC CE includes one octet for a cell index field, otherwise the MAC CE includes four octets for a cell index field.

Preferably, the cell index field is Ci field in the MAC CE.

FIG. 11A is an example of Extended PHR MAC Control Element supporting 32 serving cells with configured uplink according to embodiments of the present invention.

When the UE is configured with at least 2 cells by the eNB (Carrier Aggregation system), wherein each cell is identified by its own SCellIndex, the UE checks the highest SCellIndex among the SCellIndex of serving cells with configured uplink or, checks the highest SCellIndex among the SCellIndex of the activated cells.

One octet with C fields is used for indicating the presence of PH per SCell when the highest SCellIndex of SCell with configured uplink is less than 8 (FIG. 9A), otherwise four octets are used (FIG. 11A).

The Ci field indicates the presence of a PH field for the SCell with SCellIndex i. The Ci field set to "1" indicates that a PH field for the SCell with SCellIndex i is reported. The Ci field set to "0" indicates that a PH field for the SCell with SCellIndex i is not reported.

FIG. 11B is an example of Activation/Deactivation MAC control element of four octets according to embodiments of the present invention.

When the eNB is configured with at least 2 cells to the UE (Carrier Aggregation system), wherein each cell is identified by its own SCellIndex, the eNB checks the highest ServCellIndex among the ServCellIndex of the configured cells, or checks the highest ServCellIndex among the ServCellIndex of the activated cells.

For the case with no serving cell with a ServCellIndex larger than 7, Activation/Deactivation MAC control element of one octet is applied (FIG. 9B), otherwise Activation/Deactivation MAC control element of four octets is applied (FIG. 11B).

The Ci field indicates the activation/deactivation status of the SCell with SCellIndex if there is an SCell configured with SCellIndex i. Else the MAC entity shall ignore the Ci field. The Ci field is set to "1" to indicate that the SCell with SCellIndex i shall be activated. The Ci field is set to "0" to indicate that the SCell with SCellIndex i shall be deactivated.

In addition, the Activation/Deactivation MAC control element of four octets is identified by a MAC PDU subheader with new LCID. The transmitter transmits the MAC PDU including the new LCID which indicates that variable size of Ci field is included in the new MAC control element. When the receiver receives a MAC PDU including the new LCID, the receiver determines the size of Ci field of the received MAC control element based on the highest cell index among the cell index of the cells.

FIG. 12 is a conceptual diagram for generating a MAC control element in a carrier aggregation system according to embodiments of the present invention.

The communication apparatus configures a plurality of serving cells, wherein each of the plurality of serving cells corresponds to a respective cell index (S1201). The communication apparatus determines a size of a cell index field in a MAC CE depending on a highest cell index among the plurality of serving cells (S1203), and generates the MAC CE according to the size of a cell index field (S1205).

For example, when the transmitter determines a size of cell index field in a MAC CE, the transmitter checks the highest cell index among the cell index of the configured cells, or the transmitter checks the highest cell index among the cell index of the activated cells.

If the highest cell index is equal to or less than 7 (i.e., 0≤highest cell index ≤7), the transmitter determines the size of Ci field is 1 byte, so that 1 octet with Ci field belongs to the MAC control element.

Else if the highest cell index is larger than 7 and equal to or less than 15 (i.e., 8≤highest cell index ≤15), the transmitter determines the size of Ci field is 2 byte, so that 2 octet with Ci field belongs to the MAC control element.

Else if the highest cell index is larger than 15 and equal to or less than 23 (i.e., 16≤highest cell index ≤23), the transmitter determines the size of Ci field is 3 byte, so that 3 octet with Ci field belongs to the MAC control element.

Else if the highest cell index is larger than 23 and equal to or less than 31, (i.e., 24≤highest cell index ≤31), the transmitter determines the size of Ci field is 4 byte, so that 4 octet with Ci field belongs to the MAC control element.

Otherwise when the receiver receives a MAC control element including the Ci field, the receiver checks the highest cell index among the cell index of the configured cells or the receiver checks the highest cell index among the cell index of the activated cells.

If the highest cell index is equal to or less than 7 (i.e., 0≤highest cell index ≤7), the receiver considers that 1 octet of Ci field is included in the received MAC control element.

Else if the highest cell index is larger than 7 and equal to or less than 15 (i.e., 8≤highest cell index ≤15), the receiver considers that 2 octets of Ci field is included in the received MAC control element.

Else if the highest cell index is larger than 15 and equal to or less than 23 (i.e., 16≤highest cell index ≤23), the receiver considers that 3 octets of Ci field is included in the received MAC control element.

Else if the highest cell index is larger than 23 and equal to or less than 31 (i.e., 24≤highest cell index ≤31, the receiver considers that 4 octets of Ci field is included in the received MAC control element.

FIG. 13 is a conceptual diagram for generating a MAC control element in a carrier aggregation system according to embodiments of the present invention.

The UE is configured with at least one TAG (Timing Advance Group) by the eNB, wherein the TAG identified by its own identity value (S1301). The identity value of the TAG is, TAG ID or TAG index.

In RRC_CONNECTED, the eNB is responsible for maintaining the timing advance. Serving cells having UL to which the same timing advance applies (typically corresponding to the serving cells hosted by the same receiver) and using the same timing reference cell are grouped in a timing advance group (TAG). Each TAG contains at least one serving cell with configured uplink, and the mapping of each serving cell to a TAG is configured by RRC. In case of DC, a TAG only includes cells that are associated to the same CG and the maximum number of TAG is 8.

For the pTAG the UE uses the PCell in MCG and the PSCell in SCG as timing reference. In a sTAG, the UE may use any of the activated SCells of this TAG as a timing reference cell, but should not change it unless necessary.

For a TAG, cases where the UL synchronisation status moves from "synchronised" to "non-synchronised" include:

Expiration of a timer specific to the TAG;

Non-synchronised handover.

The synchronisation status of the UE follows the synchronisation status of the pTAG of MCG. The synchronisation status of the UE w.r.t. SCG follows the synchronisation status of the pTAG of SCG. When the timer associated with pTAG is not running, the timer associated with an sTAG in that CG shall not be running Expiry of the timers associated with one CG does not affect the operation of the other CG.

The value of the timer associated to the pTAG of MCG is either UE specific and managed through dedicated signalling between the UE and the eNB, or cell specific and indicated via broadcast information. In both cases, the timer is normally restarted whenever a new timing advance is given by the eNB for the pTAG:

restarted to a UE specific value if any; or restarted to a cell specific value otherwise.

The value of the timer associated to a pTAG of SCG and the value of a timer associated to an sTAG of an MCG or an sTAG of SCG are managed through dedicated signalling between the UE and the eNB, and the timers associated to these TAGs can be configured with different values. The timers of these TAGs are normally restarted whenever a new timing advance is given by the eNB for the corresponding TAG.

Upon DL data arrival or for positioning purpose, a dedicated signature on PRACH can be allocated by the eNB to the UE. When a dedicated signature on PRACH is allocated, the UE shall perform the corresponding random access procedure regardless of its L1 synchronisation status.

Timing advance updates are signalled by the eNB to the UE in MAC PDUs

The UE or the eNB can transmit a MAC control element to the eNB or the UE, respectively. The eNB transmits, e.g., Timing Advance Control MAC control element.

For the MAC CE including TAG identity value, e.g., Timing Advance Control MAC control element, the above invention applies by considering the identity value of the TAG instead of the identity value of the cell. I.e., the transmitter/receiver determines the length of the TAG ID field of the MAC CE according to the highest TAG index value among the index values of the TAGs (S1303).

For example, the transmitter/receiver determines that the MAC control element includes 2 bits of TAG ID field if the highest TAG identity value is equal to or less than 3, i.e., 0≤highest identity value ≤3. And if the highest TAG identity value is larger than 3, and equal to or less than 8, i.e., 4≤highest identity value ≤8, the MAC control element includes 3 bits of TAG ID field.

And the transmitter generates the MAC CE according to the size of the TAG index field (S1305), and transmits the generated MAC CE (S1307).

A new LCID is allocated to the new MAC control element to indicate that variable size of TAG ID field is included in the MAC control element. The transmitter transmits the MAC PDU including the new LCID which indicates that variable size of TAG ID field is included in the new MAC control element. When the receiver receives a MAC PDU including the new LCID, the receiver determines the size of TAG ID field of the received MAC control element based on the highest identity value among the identity values of the cells.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a communication apparatus operating in a wireless communication system, the method comprising:

configuring the communication apparatus with a plurality of Timing Advance Groups (TAGs), wherein each of the plurality of TAGs corresponds to a respective TAG index;

determining a size of a TAG index field in a Medium Access Control (MAC) Control Element (CE) depending on a highest TAG index among the TAG indices of the plurality of TAGs; and generating the MAC CE according to the determined size of the TAG index field, wherein a MAC Protocol Data Unit (PDU) subheader includes a Logical Channel Identifier (LCID) field that identifies the MAC CE including the TAG index field, whose size varies based on the highest TAG index.

2. The method according to claim 1, wherein when 0≤the highest TAG index ≤3, the size of the TAG index field is 2 bits, and when 4≤the highest cell index ≤8, the size of the TAG index field is 3 bits.

3. The method according to claim 1, wherein the MAC CE is a Timing Advance Command (TAC) MAC CE.

4. A communication apparatus operating in a wireless communication system, the communication apparatus comprising:

a transceiver; and a processor, operatively coupled to the transceiver, wherein the processor is configured to:

configure a plurality of Timing Advance Groups (TAGs), wherein each of the plurality of TAGs corresponds to a respective TAG index, determine a size of a TAG index field in a Medium Access Control (MAC) Control Element (CE) depending on a highest TAG index among the TAG indices of the plurality of TAGs, and generate the MAC CE according to the determined size of the TAG index field, wherein a MAC Protocol Data Unit (PDU) subheader includes a Logical Channel Identifier (LCID) field that identifies the MAC CE including the TAG index field, whose size varies based on the highest TAG index.

5. The communication apparatus according to claim 4, wherein when 0≤the highest TAG index ≤3, the size of the TAG index field is 2 bits, and when 4≤the highest cell index ≤8, the size of the TAG index field is 3 bits.

6. The communication apparatus according to claim 4, wherein the MAC CE is a Timing Advance Command (TAC) MAC CE.

* * * * *